United States Patent [19]
Bowling

[11] Patent Number: 5,203,388
[45] Date of Patent: Apr. 20, 1993

[54] STUMP CUTTER

[76] Inventor: John M. Bowling, 9376 Lincoln Way East, Orrville, Ohio 44667

[21] Appl. No.: 876,066

[22] Filed: Apr. 28, 1992

[51] Int. Cl.⁵ .......................................... A01G 23/06
[52] U.S. Cl. ..................................... 144/2 N; 37/302
[58] Field of Search ................ 144/2 N; 37/2 R, 2 P, 37/94; 56/119

[56] References Cited

U.S. PATENT DOCUMENTS

| | | | |
|---|---|---|---|
| 2,912,022 | 11/1959 | Ploeg et al. | 144/2 N |
| 3,308,860 | 3/1967 | De Shano | 144/2 |
| 3,568,740 | 3/1971 | Speakman | 144/2 |
| 4,074,447 | 2/1978 | Shivers, Jr. et al. | 144/2 N |
| 4,271,879 | 6/1981 | Shivers | 144/2 N |
| 4,690,183 | 9/1987 | Eilentson | 144/2 N |
| 4,709,736 | 12/1987 | Bellars | 144/2 N |
| 4,848,423 | 7/1989 | Yoder | 144/2 N |

OTHER PUBLICATIONS

Rayco RG 1635-A/SA Spec Data Rayco Manufacturing, Inc. 1991.
Rayco RG 1665(AC) Spec Data Rayco Manufacturing, Inc. 1991.
Rayco RG 1635-A Spec Data Rayco Manufacturing, Inc. 1991.
Rayco RG 1670-DC Spec Data Rayco Manufacturing, Inc. 1991.

Primary Examiner—W. Donald Bray
Attorney, Agent, or Firm—Oldham, Oldham & Wilson Co.

[57] ABSTRACT

An improved stump cutting apparatus and particularly a two-wheel trailer type of stump cutting apparatus employing a hydraulic motor, to, through a drive belt connection, drive a cutting wheel, the hydraulic motor being powered by a hydraulic pump directly mounted on a diesel engine strategically located on a cutting wheel boom, giving the unique benefit of thereby increasing cutting stability due to the presence of the substantial mass of the diesel engine and its centrally-balanced orientation.

The cutter boom sweeps side-to-side relative to the hinge head to which it is attached, and the same hinge head provides up and down motion of the cutter boom by owning a pivot located at its bottom end, whose pin unites the same member with the apparatus frame.

The present invention operates in combination with a chip-retaining deck that remains elevationally stationary relative to its transporting wheels throughout the entire stump cutting operation.

24 Claims, 8 Drawing Sheets

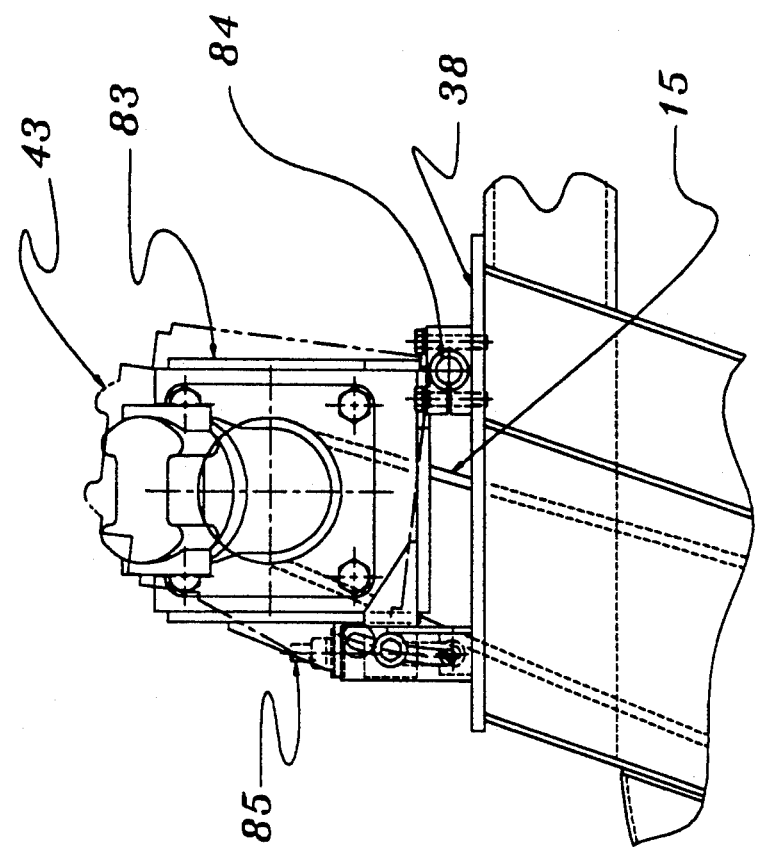
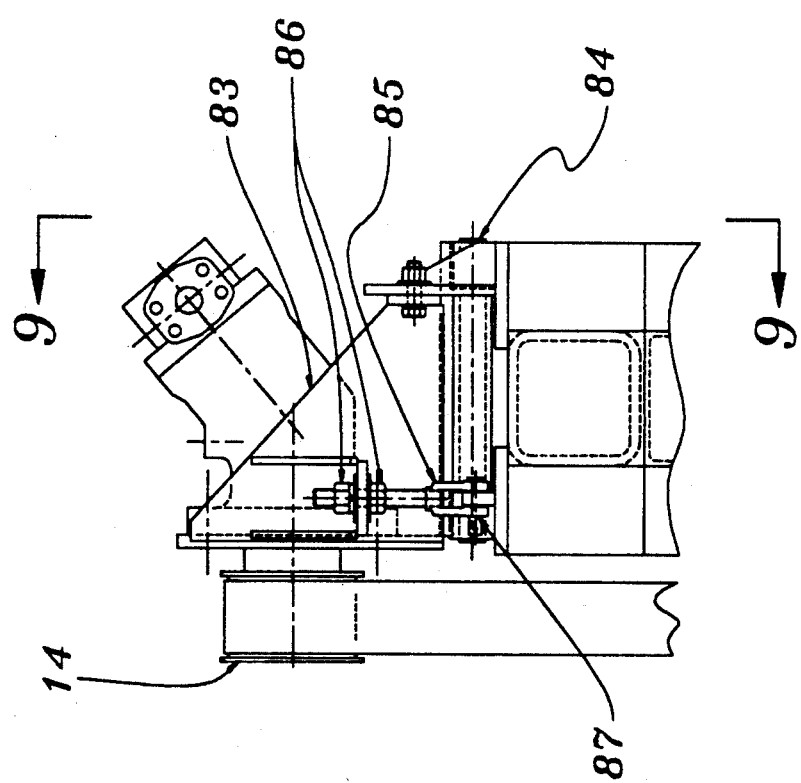
FIG. 9
FIG. 8

5,203,388

STUMP CUTTER

TECHNICAL FIELD

The present invention relates to an improved stump cutting apparatus and more particularly to a two-wheel trailer type of stump cutting apparatus employing a hydraulic motor, to, through a drive belt connection, drive a cutting wheel, the hydraulic motor being powered by a hydraulic pump directly mounted on a diesel engine strategically located on a cutting wheel boom, giving the unique benefit of thereby increasing cutting stability due to the presence of the substantial mass of the diesel engine and its centrally-balanced orientation.

BACKGROUND OF THE INVENTION

In the field of stump cutting machinery of a trailer type, it has been common practice to employ a gas- or diesel-powered engine to which drive shaft is fixedly attached a series of belts and pulleys to rotate a cutting wheel. The engine is mounted so that it rests generally centrally relative to the width of the frame, as does the cutting wheel. The desired result of such mounting is the promotion of a weight balanced apparatus. However, when a standard gas or diesel-powered engine is so oriented, it results in a substantial offset of the distal end of the engine's output shaft relative to the position on the cutting wheel shaft where a pulley might most suitably be mounted in order to accept the driving belts. Hence it is necessary to connect the output shaft to the cutting wheel using this combination of belts and pulleys.

In the interest of safety, the fewer exposed or potentially exposed moving parts of high power and speed in an invention, the more desirable an invention is. In the case of the aforementioned common practice, a number of high velocity belts and pulleys can be exposed by safety guards partially or fully removed out of necessity or neglect presenting a very true danger to the operators, as loose clothing, long hair, tools, and human body extremities are all candidates for becoming engaged in the moving parts.

An additional hazard associated with some of the aforementioned exemplary art devices is that the method of lowering the cutting wheel is caused by lowering of the entire deck. The nature of cutting stumps with such devices, results in particles of the tree stump, being forcibly displaced under the deck, where they accumulate throughout the process, resulting in the interference of the apparatus deck or guarding. These stump cutting units require a specially made skirting which can touch the ground at the maximum deck height yet adequately flex during the lowering of the deck, in order to deflect moving chips liberated during the cutting process. This hazardous condition is perpetuated if the protective skirt is not readily replaced after becoming damaged or worn.

A further danger often associated with high powered devices is the presence of a high speed toothed cutting wheel, particularly as it relates to stopping the cutting wheel should a dangerous situation arise and immediate shutdown is desired. In such a situation, stopping the cutting wheel quickly rather than gradually can mean the difference between non-incidence and injury. Many varieties of prior art devices, particularly those of chain and/or belt drive, provide no means of sudden deceleration of the cutting wheel whereas rather, a high amount of inertia being involved, the cutting wheel continues rotating at a high velocity.

Also, prior art devices routinely require the moving of the entire engine toward and away from the cutting wheel to loosen or tighten the belts driving the cutting wheel for the purpose of starting or stopping the cutting wheel.

In order to move the entire engine, as aforementioned, it has customarily been mounted on sliding members directly beneath the engine itself, which requires that the engine be located at a higher elevation than it would otherwise be necessary. This intensifies the normal vibrations associated with the operation of cutting stumps.

Additionally, a severe eccentric load is imposed upon the engine drive shaft bearings when a belt is tensioned radially against the diesel engine enough to positively force, rotatingly, cutter teeth through multiple types, conditions, and densities of wood and soil, resulting in rapid wear of the engine output shaft bearings and thus premature failure of the same.

The traditional method of driving the cutting wheel, as described above, allows the engine to be mounted only in a position which is cross-axial relative to the length of the apparatus frame. Such a restriction imposes axial stresses during operation which would be better applied side-to-side in the interest of minimalizing stresses imposed upon the frame.

The aforementioned exemplary prior art devices posses only limited capability to vary the cutting wheel speed without a significant loss of horsepower. Under certain cutting circumstances, such as in restricted access areas surrounded by fixed valuables, fine control might be attained by a slower cutting wheel revolution, as certain vibratory motions could be thus reduced. Also certain testing, such as tooth sharpness and hardness and shaft straightening requires slow, controlled revolutions with high torque.

A range of prior exemplary devices, as aforementioned, utilize a method of lowering the cutting wheel by a motion which lowers the entire deck, as the height of the cutting wheel relative to the deck and apparatus main frame is fixed. Although a simple and otherwise effective means of lowering the cutting wheel, the method here under consideration owns a certain limitation whereby space that is used for the accumulation of wood particles as they are removed from the remaining stump becomes reduced as the cutting wheel and resultingly the apparatus deck is lowered in the process of stepping the height of the stump down until it is appropriately below grade. This consequence requires special maneuvering of the cutter when cutting on larger stumps, as the accumulation of the wood particles impedes full lowering of the apparatus frame, deck and cutting wheel.

Based on the deficiencies found in the prior art devices, Applicant's invention is herein presented.

SUMMARY OF THE INVENTION

Accordingly, it is the general purpose of the present invention to provide a non-self-propelled trailer type stump cutting apparatus with a dual pivot hinge head rotationally pinned to the apparatus frame at the lower end of the hinge head for up and down motion of a cutting wheel, a cutter boom rotationally pinned thereto, and a cutting wheel attached to the cutter boom in such a manner as to afford side-to-side movement of the cutting wheel. The cutting wheel is longitudinally aligned with the axis of the cutter boom for rotation about a horizontal axis transverse to the axis of the cutter boom, by a hydraulic motor. The hydraulic motor, hydraulic pump and associated diesel engine, are mounted on the cutter boom in order to reduce vibrations and increase stability within the equipment and in the cutting operation. The engine is positioned on the cutter boom in such manner so that the longitudinal axis of the engine is parallel to and in the same vertical plane as the longitudinal axis of the cutter boom, thereby reducing overhanging mass (from side-to-side), which tends otherwise to magnify side-to-side vibrations.

A further object of the present invention is to abolish the need for offsetting of the engine output shaft from the cutting wheel drive shaft, and thus eliminate the need for second and third aforementioned pulleys, jackshaft and associated bearings.

A further object of the present invention is to provide a means of quickly halting the cutting wheel so as to reduce the risk of injury whenever the cutting wheel is not constructively in use such as at the end of the stump cutting operation and in the case of an emergency.

Still a further objects of the present invention is to lower the center of gravity of the engine relative to the ground.

A further object of the present invention is to isolate the engine from the rest of the device by the use of rubber isolation mounts located directly between the diesel engine and the apparatus frame, and thereby reduce detrimental stresses and vibration within the equipment.

A further object of the present invention is to reduce the frequency of cleaning the diesel engine air filter.

A further object of the present invention is to provide the capability to vary the cutting wheel speed without a significant loss of horsepower. Under certain cutting circumstances, such as in restricted access areas where surrounding fixed valuables exist, fine control is attainable by a slower cutting wheel revolution, as certain vibratory motions are thus reduced. Also certain testing requires slow, controlled revolutions with high torque, now accomplished by the varying displacement of hydraulic fluid capability of the hydraulic motor.

A further object of the present invention is to provide the capability to lower the cutting wheel throughout the stump cutting process without reducing the capacity of wood chip collection under the apparatus. The same is accomplished by implementing a rigid frame and deck, a cutter frame having mounted to it the cutting wheel vertically moveable independent of the deck.

Yet a further object of the present invention is to reduce the front to back vibration of the frame while increasing the stability of the cutting wheel and boom through positioning of the engine along the axis of the cutting boom.

These and other objects and advantages will become more readily apparent after a reading of the specification of the present invention taken in conjunction with the drawings.

BRIEF DESCRIPTION OF THE DRAWINGS

FIG. 8 is an end view showing in greater detail the belt tension adjusting mechanism;

FIG. 9 is a side view of FIG. 8;

DESCRIPTION OF THE PREFERRED EMBODIMENTS

Figure 1:
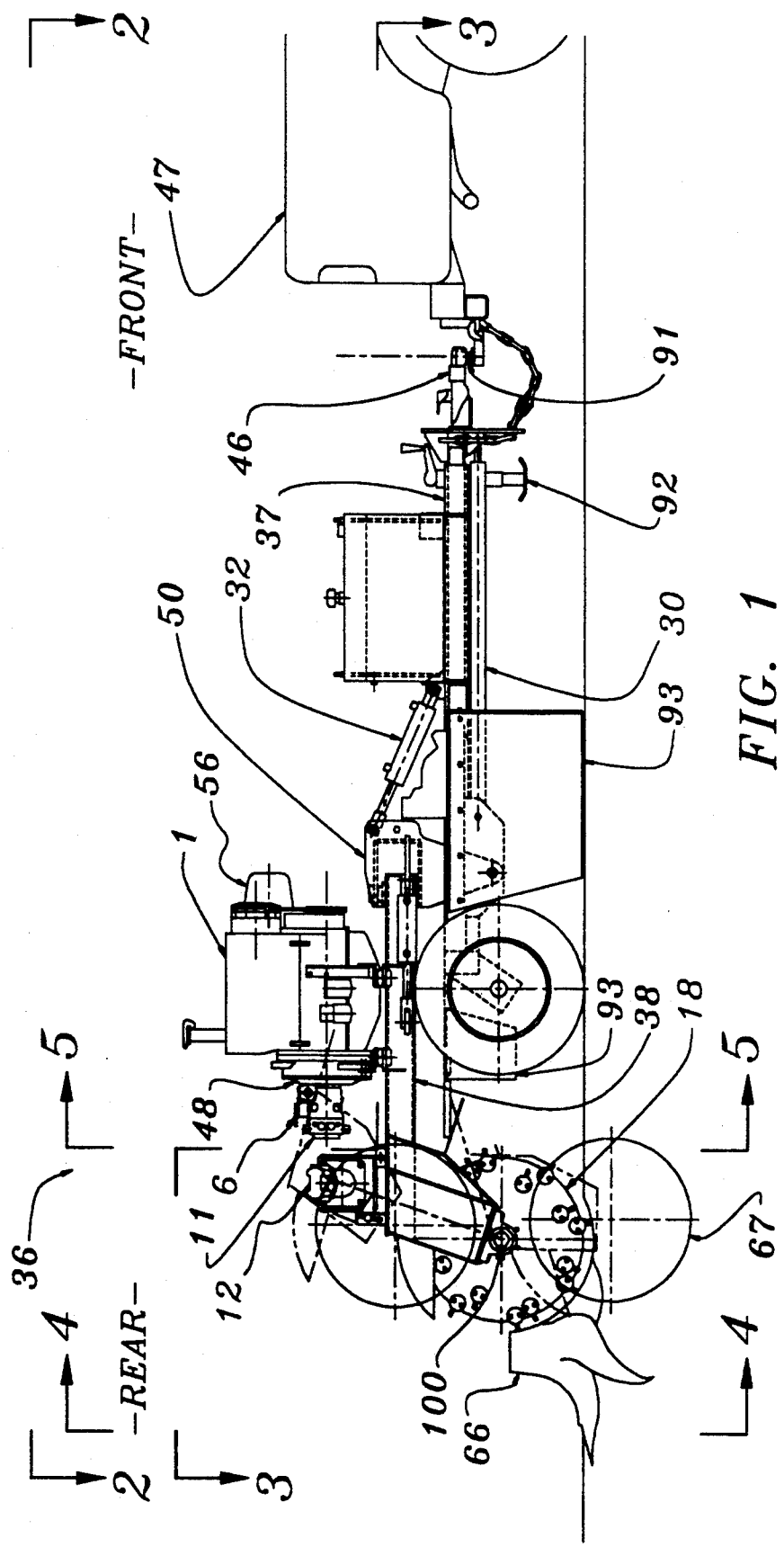
FIG. 1 is a side elevational view of a stump cutting apparatus in accordance with the present invention.

Referring now to the drawings, and in particular reference to FIG. 1, there is shown a hydraulic stump cutting device, generally denoted 36, in accordance with the present invention. The apparatus includes two major components, namely, a main supporting frame 37 of a vehicle member, and a cutter boom 38 which carries a diesel-powered engine 1, for supplying exclusive power for the operations of the stump cutting apparatus 36. The preferred embodiment of the present invention utilizes a Deutz No. BF4L1011 turbo charged 68 horse power diesel engine, although other size and type combustion engines are contemplated.

Figure 3:
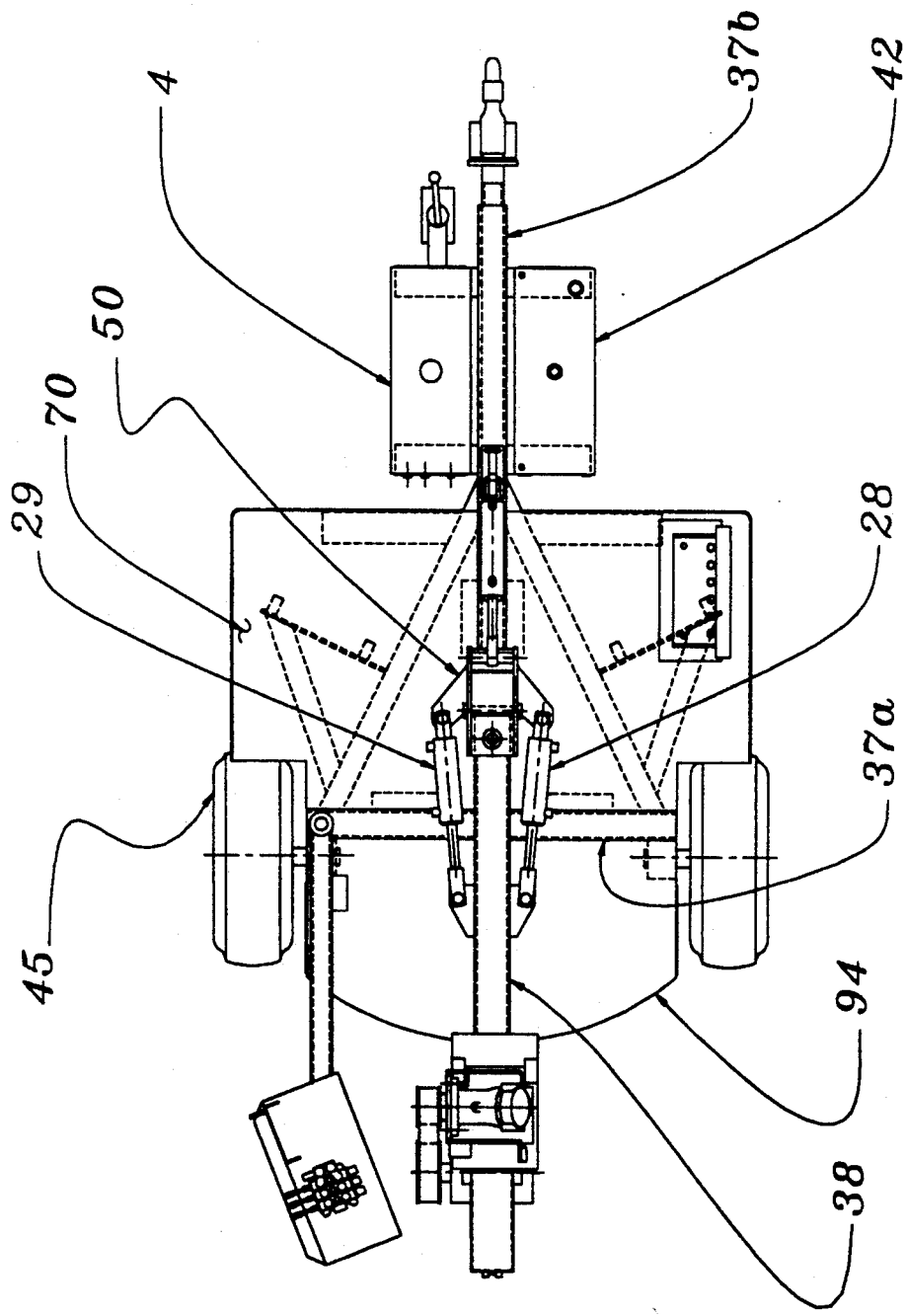
FIG. 3 is a top planar sectional view further illustrating the stump cutting apparatus, exposing the side-to-side boom operating cylinders and illustrating the resulting side-to-side positioning of the cutting wheel and the swing-out position of the operator control panel.

With reference to FIG. 3, the apparatus frame 37 is essentially a "T"-shaped structure wherein two rectangular structural steel tubing members are welded in a horizontal plane to form a "T" shape such that two wheels with pneumatic tires 45 are located approximately at the opposite ends of the "T" cross-member 37a, on individual stub-axles fixedly attached to the frame 37. The transportational wheels 45, because of the relatively light nature of the stump cutting apparatus 36, do not require brakes, as the necessary braking function may be and must be suitably provided by the towing vehicle 47. The apparatus 36 being mounted on two wheels 45 allows the stump cutting apparatus 36 to freely ride over uneven terrain.

The longer second frame member 37b extends away from its intersection with member 37a toward the front of the apparatus 36 and acts as the external member of a telescoping mechanism. A slightly smaller perimeter rectangular structural steel tubing internal member 49 (which also functions as a trailer tongue) fits within, and the external telescoping member of apparatus frame 36 accordingly slides upon it for telescoping action, as will be further discussed.

In more detail, as shown in FIGS. 1-5, the main supporting frame 37 is mounted on transporting wheels 45 and carries a fuel tank 42, a hydraulic fluid reservoir 4 and a battery 44, and has a forward-located trailer coupler 46 for attachment to a self-propelled, owing vehicle 47, such as a truck or a farm tractor, for stability while in operation and for the transporting of the device.

A variable displacement hydraulic pump 11 for operating a hydraulic motor 12 is mounted onto engine 1. The hydraulic motor 12 is operatively connected by pulleys and a belt to a cutter wheel 18, which itself is mounted on a cutter boom 38 in a rearward lower centrally disposed location. The cutter boom 38 is drivingly belt-connected to a second hydraulic pump 19 for operating hydraulic piston-cylinders 28, 29, 30, and 32 involved in the apparatus.

Figure 5:
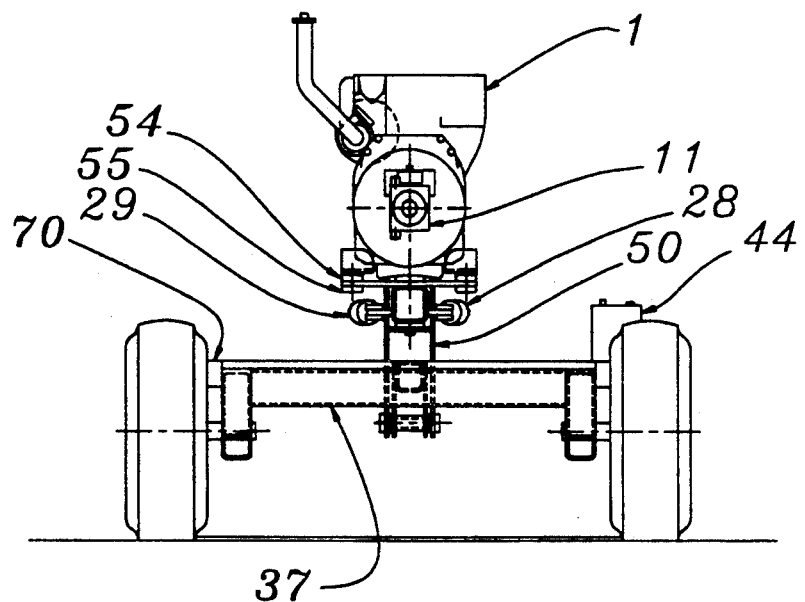
FIG. 5 is a rear elevational view further illustrating the stump cutting apparatus, exposing the engine mounting, the engine-mounted hydraulic pump, and the boom hinge head.

Now referring to FIGS. 1 and 5, the variable displacement hydraulic motor pump 11 is mounted on a flange 48, which adapts it to the aforementioned diesel engine 1, such that a splined shaft mates with a splined hole adaptor centrally mounted to the engine flywheel, rotating together at approximately 2,800 revolutions per minute. The variable displacement hydraulic motor pump 11 is a type which enables displacement of hydraulic fluid in a range of zero to approximately 36.8 gallons per minute, and so, varied by the movement of an integral valve stem 6, thus provides a force of approximately 5,000 pounds per square inch to the hydraulic motor 12. The hydraulic circuit by which motor 12 is powered is a closed circuit such that the variable displacement pump 11 may be instantly set to zero displacement by the user actuating a control handle, resulting in an almost immediate cessation of cutting wheel 18, an extremely effective safety feature. When the pump 11 is set to zero displacement, the operational continuous circuit flow of hydraulic fluid becomes physically blocked within the body of the variable displacement pump 11 so that even the high quantity of inertial force of the cutting wheel 18 acting on the hydraulic fluid cannot overcome the blockage, resulting in the near immediate stopage of cutting wheel 18. A second hydraulic pump 19 is mounted to the front end and on the side of the engine 1 so that it is rotationally powered by the engine via a belt 40 mounted between a pulley 41 fixedly mounted on the pump shaft and a pulley 39 fixedly mounted on the front drive shaft of the engine 1. This hydraulic pump 19 produces a fixed-displacement of hydraulic fluid at a rate of approximately 2.86 gallons per minute at approximately 1,500 lbs. psi powering other hydraulic features of the apparatus, such as hydraulic piston-cylinder 30 controlling the multidirectional telescopic movement of the frame 37 in combination with trailer tongue 49, hydraulic piston-cylinder 32 connected between the device frame 37 and a dual pivot hinge head 50 to effect vertical movement of cutter boom 38, and a pair of generally opposing piston-cylinders 28 and 29, each mounted on either side of the cutter boom 38 on the piston-cylinder rod-end and the piston-cylinder body-end to either side of the hinge head 50 controlling the lateral movement of cutter boom 38. Thus are all the necessary axes of motion of the cutting wheel 18 implemented for reducing a stump 51 to an appropriate depth below ground level.

Figure 2:
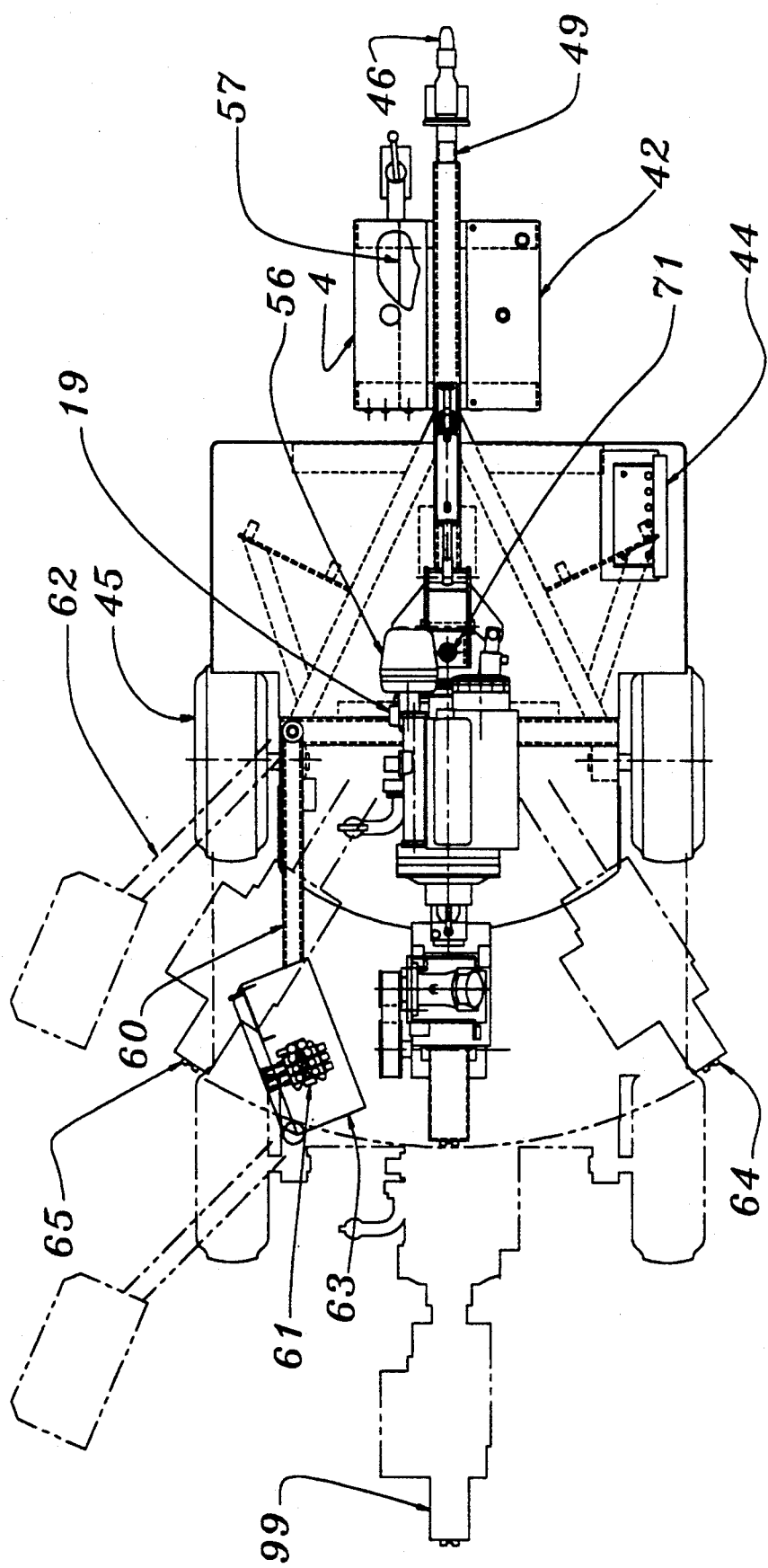
FIG. 2 is a top planar view, further illustrating the stump cutting apparatus in accordance with the present invention.
Figure 4:
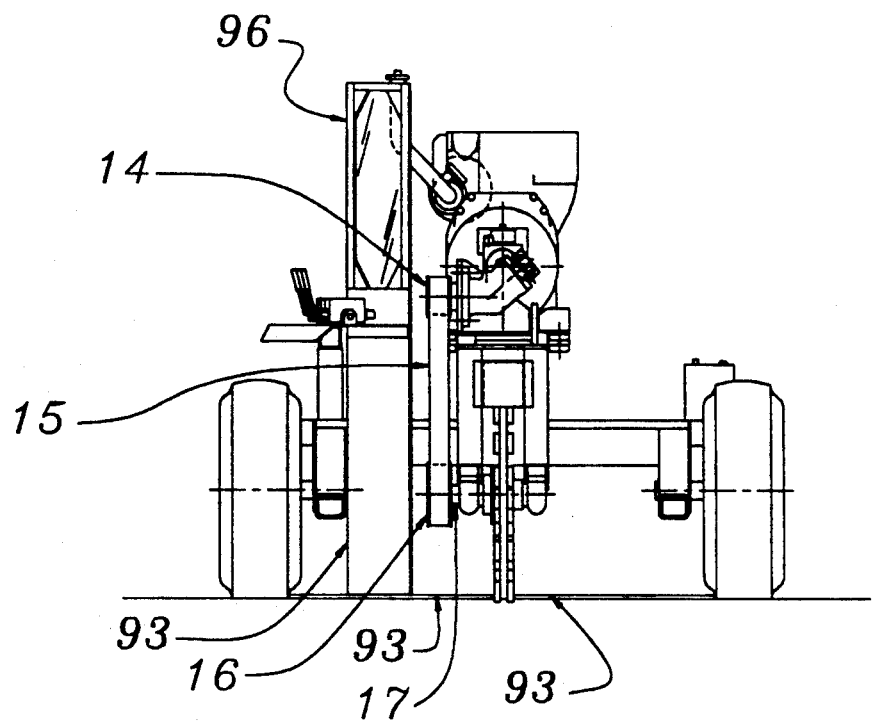
FIG. 4 is a rear elevational view of a stump cutting apparatus further illustrating the stump cutting apparatus in accordance with the present invention.

Hydraulic motor 12 is mounted separately and drivingly connected by a belt-pulley combination 14, 15, and 16, and thus is relatively compact from side-to-side for the sake of most favorably cutting stumps in close-in quarters, as the aforementioned arrangement allows for the hydraulic motor 12 to cross over the axis of the cutter boom 38, as may be seen in FIGS. 2 and 4. However more compact hydraulic motors of similar capacity mounted contiguously to the cutting wheel 18 thus eliminating belt 15 and pulleys 14 and 16 are contemplated.

The inventor has discovered that a force imposed suddenly on the cutter boom 38 by a single cutting wheel tooth impacting a stump will result in less of a sudden change in position of the cutter boom 38 if the mass of the cutter boom 38 is high.

With the aforementioned benefit in mind, the inventor has mounted engine 1 upon cutter boom 38. It is mounted in such a manner and location so as to provide a stabilizing benefit to the entire apparatus 36, when subjected to shock originating at the site of contact between the cutting wheel 18 and stump 51 or various foreign objects such as rocks and the like. By positioning the engine 1 as close to the cutting wheel 18 as possible without causing the stump cutting apparatus 36 to tip when detached from the transporting vehicle 47, it has been observed that the additional mass 1 accompanying the cutting wheel 18 in its swing paths indeed lessens the intensity of shock incurred by cutter boom 38 as well as to the rest of the apparatus 36, thereby causing the cutting wheel 18 to more firmly and effectively engage the stump 51, providing a safer, quicker, and less apparatus-wearing stump-reduction process.

By positioning the engine 1 in an orientation whereby its axis is vertically coplanar with the cutter boom 38 axis, side-to-side vibration has been down-scaled. The engine 1 has additionally been mounted with elastic mounting pads 54 and 55 so that vibrations between the engine 1 and the stump cutting apparatus proper 36 are dampened, promoting smoother operation. The inventor has found that LORD "Safetied TM" sandwich mounts (SSB26-1000-1) are suitable. Engine 1 is mounted in an orientation such that its air intake and filter 56 are pointed away from the cutting wheel operation so as to minimalize involvement of airborne matter churned-up by the cutting wheel 18.

A storage tank 4 of approximately 28 gallon capacity is provided on the frame 37 for storing the hydraulic fluid of the system. A baffle 57, in the form of a single plate is vertically integrated in the center of the tank 4, with either side end welded to two opposing inside walls of the tank 4 and the bottom end welded to the bottom of the tank 4, so as to separate the fluid supply side from the fluid return side. Baffle plate 57 has a small opening in one area remote from the tank supply and return wall so that the return fluid being elevated in temperature, will be controllably reintroduced and thereby cooled in the main body of fluid in tank 4 before recirculation. It has been found that by maintaining approximately 25 gallons of hydraulic fluid in the tank 4 of aforementioned design, a sufficient cooling of the hydraulic fluid thus occurs. An additional benefit derived from the aforementioned baffle 57 is to allow the escape of air from the return hydraulic fluid before the fluid is available for recirculation, as air in the hydraulic system can cause cavitation to occur in the pumps and hydraulic cutting wheel motor 11. Optionally, a magnetic filter 5 for the removal of large particles from the hydraulic fluid is mounted in the hydraulic fluid lines 35 and 58 and may be supplemented by the additional use of a physical filter for dirt removal internally fitted in the return hose 59 to the hydraulic storage tank 4.

Figure 10:
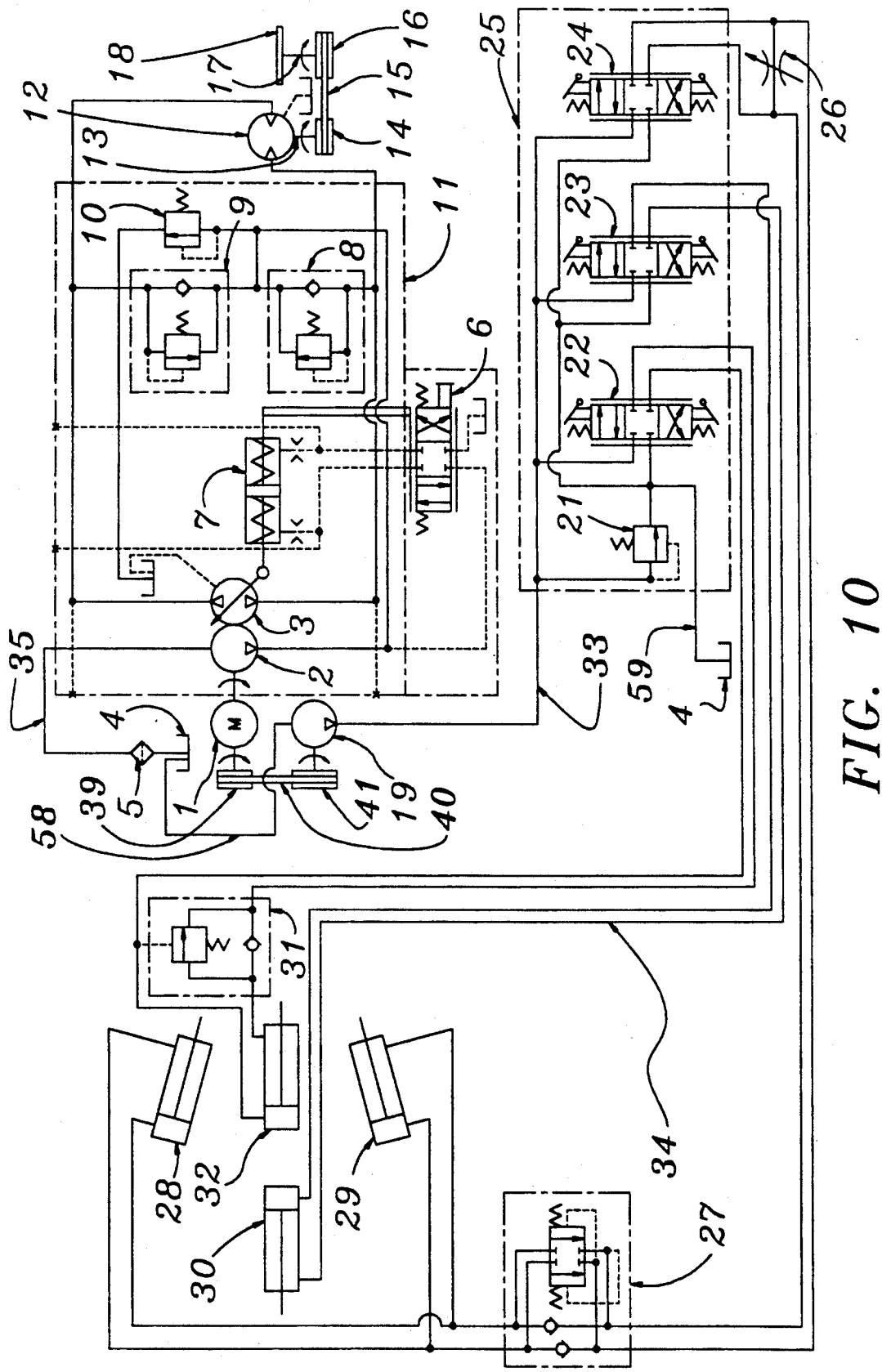
FIG. 10 is a hydraulic schematic comprising both the cutter wheel hydraulic motor system as well as the hydraulic cylinders system.

A control console 60 with the operator controls 61 thereupon-mounted is provided, whereas the control console is locked in a retracted position while in storage and can be unfolded to a position 62 appropriate to a good visual position for the user and there locked in position 62. In the present invention 36, it has been deemed appropriate to store the console 60 in a position which folds toward the cutting wheel 18 rather than away from the cutting wheel 18. Upon the console table 63 is mounted a key-operated ignition, an engine throttle, a variable-displacement pump throttle, a triple valve-pack 25 for operation of each cutting wheel motion-controlling piston-cylinder 28, 29, 30, and 32, a flow control valve 26 (see FIG. 10) for conveniently varying the maximum speed of the side-to-side motion 64 and 65 of the cutting wheel 18, as is appropriate to suit varying types of stumps 51 and conditions, and an engine hour meter for use in conjunction with an engine maintenance program. For additional description of the present stump cutting apparatus 36 hydraulic system, reference should be made to hydraulic schematic, FIG. 10. Graphic symbols used in FIG. 10 conform to The American National Standards Institute (ANSI) specifications.

Figure 6:
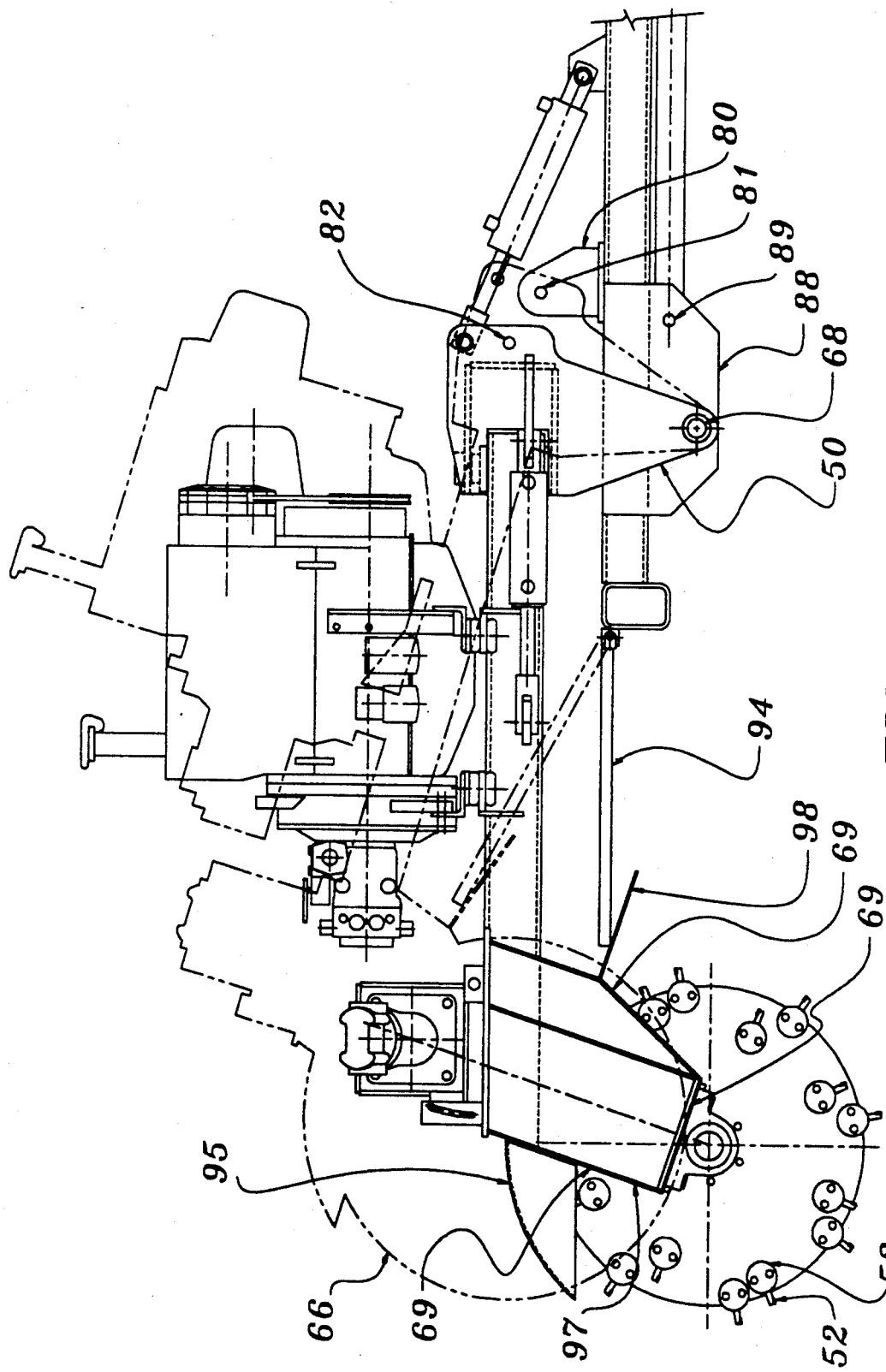
FIG. 6 is a view of the cutter boom and boom-mounted components.
Figure 7:
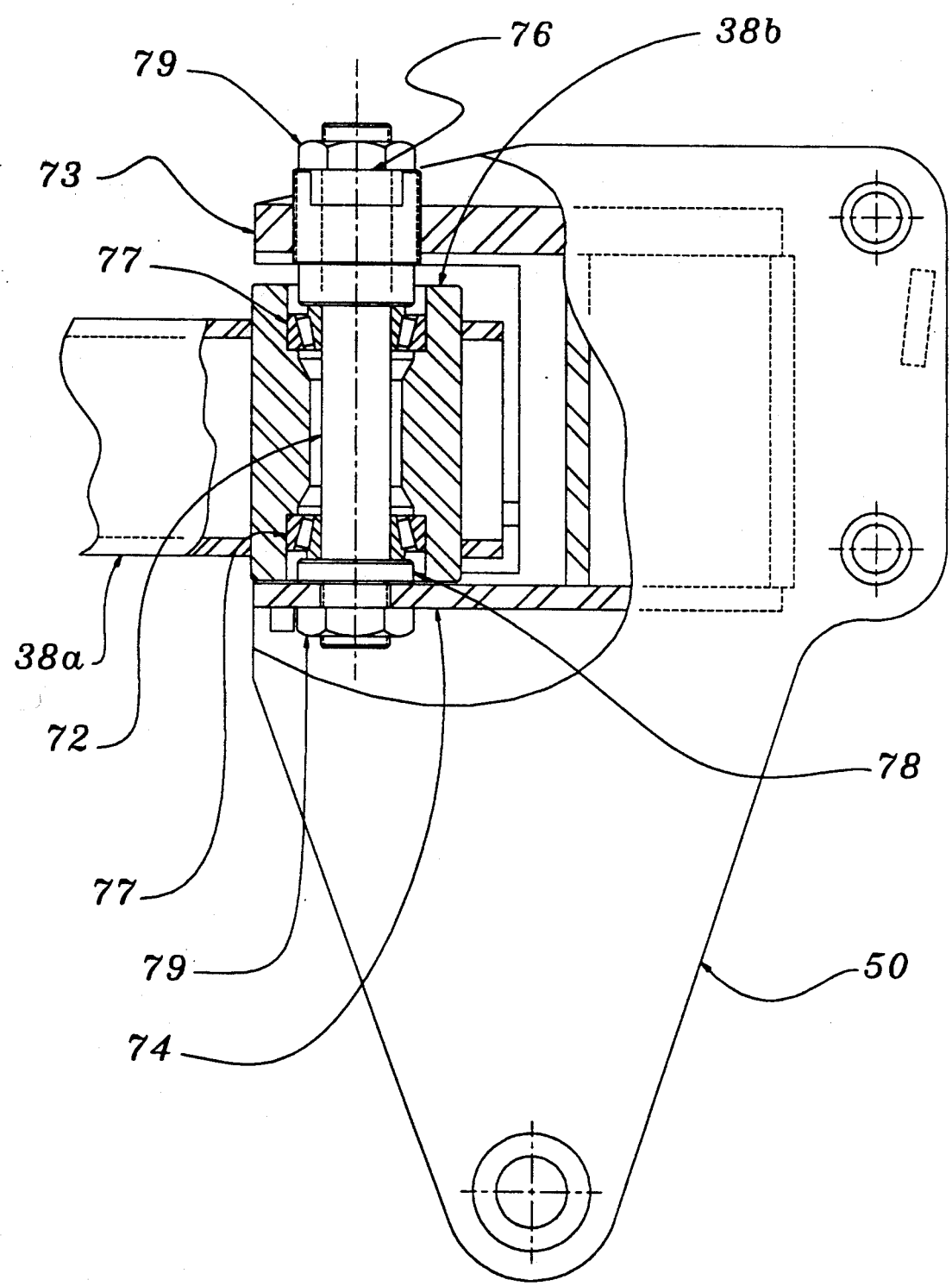
FIG. 7 is a cut-away view of the pivoting joint between the cutter boom and the hinge head.

Now referring to FIG. 6, a dual hinge head 50 is provided as the cardinal member for attaining the aforementioned vertical as well as horizontal cutting wheel 18 motion. The hinge head 50 used in the present invention 36 pivots vertically and is attached at a generally horizontally-pinned connection 68 at its lower end to the apparatus frame 37 and allows lateral movement of the cutter boom 38 by means of the attachment of a generally vertically-pinned pivotal attachment 38b located in the centrally front end of the cutter boom 38 to a centrally upper rear location of the hinge head 50. One distinct advantage of hinge head 50 is that the vertical pivoting motion taking place near the frame 37 maximizes the area covered by guarding (deck 70) so that cut chips and associated debris are efficiently contained, as only a narrow opening in the deck is required for the hinge head 50 to move. The deck 70 remains stationary relative to the point in which the stump cutting apparatus 36 contacts the ground, resulting in a consistent volume available for wood chip and associated debris collection. It may be noted that each of the major pivots on the invention have grease fittings, including each set of piston-cylinders 28, 29, 30, and 32 pivot connections. FIG. 7 discloses in greater detail the vertically-pinned pivot 71 (of FIG. 2) between the cutter boom 38 and the hinge head 50. A king pin 72 is used to hold the cutter boom 38 to the hinge head 50 and is male screw-threaded on either end. The hinge head 50 is comprising of two, generally horizontal, main supportive flanges 73 and 74 fixedly attached to two generally vertical side members, one flange 73 located above and the other 74 below the pivot joint 75 of the cutter boom 38. The top flange 73 has a female screw-threaded hole so that a preload sleeve 76, which itself has a clearance hole for allowing the king pin 72 to pass through and on which outer diameter is a male screw thread, may engage with the top flange 73 female screw-threaded hole. The bottom flange 74 of the hinge head 50 has a clearance hole concentric with the female screw-threaded hole just large enough to allow the king pin 72 to pass through. The opposing flat faces of the outer race of two tapered roller bearings 77 are captured against the flat top and bottom, and are concentric with, a clearance hole at the pivot joint 75 of the cutter boom 38. The king pin 72 freely passes, respectively from bottom to top: through the hole in bottom flange of the hinge head 50, through a spacer-sleeve 78 which rests on the top surface of the bottom hinge head flange 74, through the bottom roller bearing 77, through a clearance hole in the cutter boom 38, through the top roller bearing 77, and through the preload sleeve 76, and is prohibited from becoming dislodged by nut 79 screwed on each end. The bottom flat face of the preload sleeve 76, when the preload sleeve 76 is rotated in one direction, contacts with and moves against the top flat face of the upper roller bearing 77 whereas the bottom flange 74 of the hinge head 50 opposes the movement, resulting in forcing the inner and outer races of the roller bearings 77 evenly against rollers of the roller bearings 77, thereby removing wear-accelerating clearances within the roller bearings 77. Approximately 125 foot-pounds has been found to be an effective torque at which to set the preload sleeve 76.

Now referring to FIG. 6, the hinge head 50 includes a temporary position-holding device whereby a lug 80 is fixedly attached to the apparatus frame 37 and extends vertically upward therefrom. Lug 80 has a hole 81 formed therein and corresponding to a set of two concentric holes 82 located in the hinge head 50 such that holes 81 and 82 are lined-up by pivoting the hinge head 50 about its horizontal pivot 68 until the cutter boom 38 is raised to a position suitable for the apparatus being transported or put in storage. A retaining pin is inserted through holes 81 and 82, preventing the hinge head 50 from pivoting about the horizontal pivot point until the pin is withdrawn. The pin is captured in a spring-loaded (not shown) housing fixedly attached to the side of the hinge head 50 such that the pin, except when pulled-on by the user, is always forced by a compression spring toward the pinning hole in the hinge head 50.

Now referring to FIGS. 8 and 9, a belt tension -inducing and -holding device having hydraulic motor 12 for powering cutting wheel 18 is fixedly attached to an independent frame 83 which has one end 84 pivotingly connected to the cutter boom 38 such that when pivoted 43 will move the pulleys 14 and 16 apart, providing suitable tension to the drive belt 15. The end of the independent frame 83 opposite the pivot 84 is captured by a male screw-threaded rod 85 with two nuts 86 thereon mounted, the male screw-threaded rod 85 being pivotingly attached at its opposite end 87 to the cutter boom 38. By rotating the nuts 86 upon the threaded rod 85 the belt 15 is thus tensioned.

Now referring to FIGS. 1 and 6, fixedly attached to either side of the apparatus frame 37 aforementioned central member 37a, and extending beneath it, and close to the "T" cross-member, is a pair of plates 88 which provides pivot locations for the hinge head 50 horizontal pin 68 and for the telescope-functioning hydraulic piston-cylinder 30 horizontal pin 89. The opposite end of the piston-cylinder 30, is pivotally mounted 90 to the front end of the internal telescoping member 49. When the frontal chamber of the aforementioned piston-cylinder 30 is pressurized, the entire apparatus frame 37 moves with the body of the pivotally attached piston-cylinder 30.

Now referring to FIGS. 1 and 2, a trailer coupler 46 is fixedly attached to the end of the aforementioned telescoping trailer tongue 49. A hammerblow bulldog type is used, whereas it is mounted to a 2" diameter ball 91 as well as known in the art.

Again referring to FIGS. 1 and 2, a parking jack 92 is removably mounted to the apparatus frame 37. It is constructed with a telescoping feature comprising an outer cylinder housing and an inner cylinder. The inner cylinder has a ground-contacting pad at the lower end and moves up and down when a hand crank mounted on the upper end of the external cylinder is rotated. The entire jack 92 may then be rotated from a vertical position such that the pad is resting on the ground as when the stump cutting apparatus 36 is in storage, and rotated to a horizontal position for holding the jack 92 while the apparatus 36 is being transported.

Now referring to any of FIGS. 1-6, a method of retaining the matter that the cutting wheel 18 liberates and propels is provided by a combination of steel guarding 70, 94, and 95, rubberized skirting 93, and a transparent shield 96. Fixedly attached to the top and toward the rear of the apparatus frame 37, in a generally horizontal plane, is a steel sheet which serves as a deck 70 and which downwardly deflects particles of cut matter. Fixedly mounted to the front and sides of the deck 70 are flexible rubber-impregnated fabric skirts 93 which nearly touch the ground and so encapture projectiled cut particles. The flexible nature of the skirting 93 allows for the movement of the apparatus 36 over uneven terrain without damage. To the rear end of the deck 70 is fixedly attached a set of lugs with pivot holes which are parallel to the wheel axles so that a guard member 94 with mating lugs is pivotingly attached whereas it may pivot up-and-down as shown in FIG. 6. The cutting wheel 18 is attached to the cutter boom 38 at the end remote from frame member 37 and is suspended below and away from the main member of the boom 38 by side plates. To the side plates are fixedly attached flanges, the lowest of which have pillow block type bearings fixedly attached. The combination of side plates and flanges comprise a cutting wheel housing 97. Cutting wheel housing 97 further comprises a lip 98, fixedly attached to the front end and angling away therefrom, such that pivoting guard member 96 rests. Thus, as the cutting wheel 18 is raised or lowered pivoting guard member 94 moves along thereby maintaining a suitably enclosed environment around the immediate front of cutting wheel 18 at all times. Attached to either side of the guard member 94 are flexible skirts 93 similar to those described previously herein. Attached to the upper rear end of the cutting wheel housing 97 is a removable guard 95 which covers an area just beyond the cutting wheel 18 perimeter, and utilizing its curvature, serves to deflect the last of any projectiles produced by the cutting wheel 18 safely downward. Additional protection from projectiled cut particles is provided to the user as he stands at the controls console 60. Hanging from the control console table 63 and nearly touching the ground is a skirt 93 of a design formerly described, protecting the user, generally from the waist-down, and projecting in a vertical plane upwards is a transparent shield 96. The shield 96 is composed of transparent Lexan ®, an extremely tough plastic-type of material. (Lexan is a registered trademark of the Clorox Corporation.) It is captured by a steel frame 37 fixedly attached to the control console table 63, as may be seen in FIG. 4.

In a preferred mode of operation, the user stands behind the control console 60 while the control console 60 is in the extended position 62, so as to manipulate the controls 61. From this position the operator can vary the engine speed, start and stop the cutting wheel 18 as well as vary its cutting speed. Still from this position the user may lower and raise the cutting wheel 18, extend the cutting wheel 18 forward and back, or swing the cutting wheel 18 back-and-forth.

A stump 51 is cut to an appropriate level below the ground in the following manner: First the apparatus 36 is positioned by the transportation means 47 with the cutting wheel 18 close to the stump 51. The cutting wheel 18 is swung to one side, then lowered to a level where the cutting wheel shaft 100 remains above the top of the stump. The cutting wheel 18 is then extended slightly such that subsequent swinging across of the cutting wheel 18 will cause it to engage the stump 51. The cutting wheel 18 is then made to rotate, and while at a sufficient velocity it is made to swing across slowly, from one side 64 of the stump 51 to the other 65, removing the amount of stump 51 that is in its path. Afterwards the cutting wheel 18 is again extended slightly such that subsequent swinging across of the cutting wheel 18 will cause it to further engage and remove remaining portions of the stump 51. The aforementioned procedure is repeated until just before the cutting wheel 18 shaft is directly above the edge of the stump 51. Then the cutting wheel 18 is lowered slightly and is made to swing across slowly, from one side 64 of the stump to the other 65, removing the amount of stump 51 that is in its path. The aforementioned procedure is repeated until that section of the stump is removed to a sufficient depth. The cutting wheel 18 is then raised to a level where the cutting wheel shaft 100 is again just above the top of the stump 51, and the entire aforementioned procedures are repeated until the entire stump 51 is reduced to the desired depth. The herein disclosed stump cutting apparatus 36 will accordingly remove stumps 51 of any diameter.

Thus, in accordance with the present invention 36, the balanced construction of the device 36 provides an extremely efficient means for removing tree stumps in a safe and convenient manner.

Various changes coming within the spirit and scope of the present disclosure may suggest themselves to those skilled in the art. Hence, it is not wished that any limitation be imposed so as to restrict the present invention to the specific embodiments herein shown and described or uses mentioned, but intend the same to be merely exemplary. The scope of the invention is to be limited only by the appended claims.

What is claimed is:

1. An improved stump cutting apparatus of the type having a wheel supported frame, said frame having at least a first and a second frame member intersecting in an essentially "T" configuration, said first frame member having a forwardly projecting tongue for towing, a rotating cutting wheel having a plurality of radially extending cutting teeth circumferentially secured about the periphery of said cutting wheel, said cutting wheel mounted on a cutting boom having a first and second end and positioned rearwardly of said frame, a power drive means for powering said cutting wheel and having at least a hydraulic pump and motor wherein the improvement comprises:

said cutting boom having a single longitudinal axis, said cutting boom being non-jointed and pivotally attached at said first end to said frame, said cutting wheel suspendingly mounted directly from said second end of said cutting boom;

a rotational engine means operatively connected to said power drive means and having a longitudinal axis, said engine means being mounted along said cutting boom such that the longitudinal axis of said engine means is essentially coaxial to the longitudinal axis of said cutting boom.

2. The improved stump cutting apparatus as recited in claim 1 wherein said engine means is mounted on the longitudinal axis of said cutting boom at a location ranging from approximately ¼ to ¾ of the boom's total length from either end.

3. The improved stump cutting apparatus as recited in claim 1 wherein at least one hydraulic pump of said power drive means further comprises:
   a variable displacement pump for controlling the initiation, cessation and speed of said cutting wheel and further capable of causing approximately immediate cessation in the rotation of said cutting wheel.

4. The improved stump cutting apparatus as recited in claim 1 wherein said rotational engine means includes an air filtering means positioned essentially away from the operation of said cutting wheel.

5. The improved stump cutting apparatus as recited in claim 1 further comprising a dual pivot hinge head rotationally attached at a lower end to said frame and at an upper end to the end of said cutting boom opposite said cutting wheel for the vertical and lateral movement of said cutting boom relative to said frame.

6. The improved stump cutting device as recited in claim 5, wherein said dual pivot hinge head is rotationally pinned to said frame at the lower end of said hinge head for affecting vertical motion of said cutting wheel and rotationally pinned to said cutting boom at the upper end of said hinge head so as to control lateral motion of the cutting wheel relative to the flame.

7. The improved stump cutting apparatus as recited in claim 5 wherein said apparatus further comprises a second hydraulic means controlling the vertical and lateral movement of said cutting boom.

8. The improved stump cutting apparatus as recited in claim 7 wherein said first frame support member further comprises a telescoping frame member for outwardly extending the longitudinal axis of said first frame support member to cause forward and rearward horizontal movement of said apparatus.

9. The improved stump cutting apparatus as recited in claim 8 wherein movement of said telescoping frame member is controlled by said first or second hydraulic means.

10. The improved stump cutting apparatus as recited in claim 1 wherein said apparatus further comprises a chip collection means, said chip collection means having an essentially horizontal deck surface mounted onto said frame and extending forward of said second frame member, and a guard member attached to a substantial portion of the periphery of said deck and extending downward therefrom.

11. The improved stump cutting apparatus as recited in claim 10 wherein said chip collection means further comprises a chip deflecting member pivotally mounted along the axis of said second frame support member, extending rearward between said second frame support member and said cutting wheel and below said cutting boom, said chip deflecting member fixedly connected to said cutting boom so as to pivot correspondingly with said cutting boom.

12. The improved stump cutting apparatus as recited in claim 1 wherein said device further comprises a cutting boom retaining device for retaining said cutting boom in a predetermined vertical position by restricting movement of said pivot head.

13. A hydraulic stump cutting apparatus comprising in combination:
   a mobile wheel supported frame, said frame having at least a first and a second frame member intersecting in an essentially "T" configuration, said first frame member having a forwardly projecting tongue for towing;
   a cutting boom having a single longitudinal axis and a first and a second end; said cutter boom being non-jointed and pivotally attached at said first end to said frame so as to extend rearward of said frame;
   a rotating cutting wheel having a plurality of radially extending cutting teeth circumferentially secured about the periphery of said cutting wheel, said cutting wheel operatively mounted at said second end of said cutter boom;
   a power drive means for powering said cutting wheel having at least a hydraulic pump and motor; and
   an engine means operatively connected to said power drive means and having a longitudinal axis, said engine means mounted coaxially along the length of said cutter boom.

14. The hydraulic stump cutting apparatus as recited in claim 13 wherein said engine means is mounted such that its longitudinal axis is essentially parallel to the longitudinal axis of said cutting boom.

15. The hydraulic stump cutting apparatus as recited in claim 13 wherein said engine means is mounted on the longitudinal axis of said cutting boom at a location ranging from approximately ¼ to ¾ of the boom's total length from each end.

16. The hydraulic stump cutting apparatus as recited in claim 13 wherein at least one hydraulic pump of said power drive means further comprises:
   a variable displacement pump for controlling the initiation, cessation and speed of said cutting wheel and further capable of causing approximately immediate cessation in the rotation of said cutting wheel.

17. The hydraulic stump cutting apparatus as recited in claim 13 wherein said rotational engine means includes an air filtering means positioned essentially away from the operation of said cutting wheel.

18. The hydraulic stump cutting apparatus as recited in claim 13 further comprising a dual pivot hinge head rotationally attached at a lower end to said frame and at an upper end to the end of said cutting boom opposite said cutting wheel for the vertical and lateral movement of said cutting boom relative to said frame.

19. The hydraulic stump cutting apparatus as recited in claim 18 wherein said apparatus further comprises a second hydraulic means controls the vertical and lateral movement of said cutting boom.

20. The hydraulic stump cutting apparatus as recited in claim 13 wherein said apparatus further comprises a chip collection means, said chip collection means having an essentially horizontal deck surface mounted onto said frame and extending forward of said second frame member, and a guard member attached to a substantial portion of the periphery of said deck and extending downward therefrom.

21. The hydraulic stump cutting apparatus as recited in claim 20 wherein said chip collection means comprises a chip deflecting member pivotally mounted along the axis of second frame support member, extending rearward between said second frame support member and said cutting wheel and below said cutting boom, said chip deflecting member fixedly connected to said cutting boom so as to pivot correspondingly with said cutting boom.

22. The hydraulic stump cutting apparatus as recited in claim 13 wherein said device further comprises a cutting boom retaining device for retaining said cutting boom in a predetermined vertical position by restricting movement of said pivot head.

23. The improved stump cutting apparatus as recited in claim 19 wherein said first frame support member further comprises a telescoping frame member for outwardly extending the longitudinal axis of said first frame support member to cause forward and rearward horizontal movement of said apparatus.

24. The hydraulic stump cutting apparatus as recited in claim 23 wherein movement of said telescoping frame member is controlled by said first or second hydraulic means.

* * * * *